(12) United States Patent
Yamakita

(10) Patent No.: US 6,272,490 B1
(45) Date of Patent: Aug. 7, 2001

(54) DOCUMENT DATA LINKING APPARATUS

(75) Inventor: Tooru Yamakita, Fussa (JP)

(73) Assignee: Casio Computer Co., Ltd., Tokyo (JP)

( * ) Notice: Subject to any disclaimer, the term of this patent is extended or adjusted under 35 U.S.C. 154(b) by 0 days.

(21) Appl. No.: 09/204,527

(22) Filed: Dec. 3, 1998

(30) Foreign Application Priority Data

Dec. 26, 1997 (JP) .................................................. 9-360023

(51) Int. Cl.[7] .............................. G06F 7/00; G06F 17/30
(52) U.S. Cl. ..................... 707/4; 707/1; 707/9; 707/100; 707/102; 707/513; 709/202
(58) Field of Search .................... 707/1, 3, 103, 707/104, 10, 501, 513, 9, 102; 709/217, 218, 219

(56) References Cited

U.S. PATENT DOCUMENTS

| 5,371,807 | * | 12/1994 | Register et al. | 382/14 |
| 5,694,594 | * | 12/1997 | Chang | 395/606 |
| 5,758,332 | | 5/1998 | Hirotani . | |
| 5,787,421 | * | 7/1998 | Nomiyama | 707/5 |
| 5,819,261 | * | 10/1998 | Takahashi et al. | 707/3 |
| 5,920,859 | * | 7/1999 | Li | 707/5 |

FOREIGN PATENT DOCUMENTS

| 3-95673 | 4/1991 | (JP) . |
| 5-20362 | 1/1993 | (JP) . |
| 7-282079 | 10/1995 | (JP) . |
| 8-87526 | 4/1996 | (JP) . |

OTHER PUBLICATIONS

"Automatic Hypermedia Link Generation", IBM Technical Bulletin, U.S., IBM Corp., New York, vol. 35, No. 1A, Jun. 1, 1992 (Jun. 6, 1992), pp. 447–448, XP000308936, ISSN: 0018–8689—entire document.

* cited by examiner

Primary Examiner—Thomas Black
Assistant Examiner—Jacques Veillard
(74) Attorney, Agent, or Firm—Frishauf, Holtz, Goodman, Langer & Chick, P.C.

(57) ABSTRACT

This invention has as its object to assign a link destination address to each word in a designated document. A word to be linked is selected from those in the designated document, and information of a search result including a corresponding link destination address and comment is received from a search site upon inquiry about the word. The similarity between the comment included in the information and the contents of the designated document is calculated to select information of a search result with a higher similarity. Then, an entry which registers the link destination address of the selected information, and the currently processed word name is registered in a link destination table. At the same time, a pointer to that entry is stored in correspondence with the currently processed word in the designated document, and that word is highlighted.

13 Claims, 8 Drawing Sheets

FIG.3

| (POINTER a) | WORD . LINK LINK<br>NAME A ∙ DESTINATION a1, DESTINATION a2, ⋯ |
|---|---|
| (POINTER b) | WORD . LINK LINK<br>NAME B ∙ DESTINATION b1, DESTINATION b2, ⋯ |
| ⋮ | ⋮ ⋮ |

FIG.8

| HEADER, TABLE ADDRESS, DOCUMENT ADDRESS | |
|---|---|
| (POINTER α) | WORD . LINK          LINK<br>NAME A · DESTINATION α1, DESTINATION α2, ··· |
| (POINTER β) | WORD . LINK          LINK<br>NAME B · DESTINATION β1, DESTINATION β2, ··· |
| ⋮ | ⋮          ⋮          ⋮<br>INTRA-FILE LINK DESTINATIION TABLE |
| DOCUMENT DATA<br>· · · · · · · · · · · | |

DOCUMENT DATA LINKING APPARATUS

BACKGROUND OF THE INVENTION

The present invention relates to a technique for automatically appending a link destination address on a computer network to document data.

As computer networks such as the Internet and the like have spread rapidly, an environment that allows the user to easily search for the URL (uniform resource locator) addresses of link destinations corresponding to a predetermined keyword is in order.

In order to implement such search, conventionally, the user accesses a site called a search site dedicated to such searches, inputs a keyword for the contents to be obtained by a search on a search form of, e.g., a Web page provided by that site, and then acquires link destination addresses pertaining to that word as the search results. When each search result is provided as a Web page, the user need only click each map image on the displayed search result or each highlighted anchor tag using, e.g., a mouse, thus easily accessing a target site via the corresponding link destination address.

However, in such conventional system, the user must explicitly specify a word to be searched for by the search site, resulting in cumbersome search operation.

The link destination address searched once is saved as a history in a Web browser of a computer operated by the user. In order to use this history data in an arbitrary document, the link destination address saved as the history must be set for each word in the document using a given application program, also resulting in troublesome operation.

BRIEF SUMMARY OF THE INVENTION

It is an object of the present invention to provide an apparatus for appending a link destination address to each word in an arbitrary document.

To achieve the above object, there is provided a document data linking apparatus for linking document elements in document data, comprising: a link destination table including at least one entry in which document element identification information and at least one corresponding link destination address are registered; a link destination address inquiry module for inquiring of a predetermined search site as to a document element in the document data, and receiving search results each including a link destination address and link destination information thereof in response to the inquiry; a similarity detection module for detecting a similarity between the link destination information included in each search result and contents of the document data; and a link destination address setting module for selecting search results with higher similarities on the basis of the similarity detection result, registering an entry, which registers the link destination addresses of the selected search results and document element identification information for identifying the currently selected document element, in the link destination table, and storing access information in the registered entry in correspondence with the currently selected document element in the document data.

According to a document data linking apparatus realized as the first aspect of the present invention, each document element in document data can be automatically linked. Also, a link destination table is prepared, and only access information to an entry in the link destination table is stored at the position of each document element in the document data. In this way, a group of link destination addresses need not be repetitively stored in units of positions of document elements that appear repetitively, and link destination addresses can be efficiently set.

As a result, the need for conventional cumbersome operations such as input of a keyword, search, setting in a document, and the like can be obviated. Since a link destination pertaining to data such as a document can be automatically set, required information can be referred to from various information fields as needed, and the apparatus is effective for collecting related information of data, proofreading documents, and so forth.

According to a link destination address display/access apparatus or link destination address access apparatus realized as the second or third aspect of the present invention, the user can immediately access a link destination address from each automatically linked document element in document data.

According to a document data file distribution apparatus realized as the fourth aspect of the present invention, automatically linked documents can be easily distributed.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 3 shows an example of the data format of a link destination table;

FIG. 8 shows an example of the data format of a document file including an intra-file link destination table.

DETAILED DESCRIPTION OF THE INVENTION

The preferred embodiments of the present invention will be described in detail hereinafter with reference to the accompanying drawings.

Figure 1:
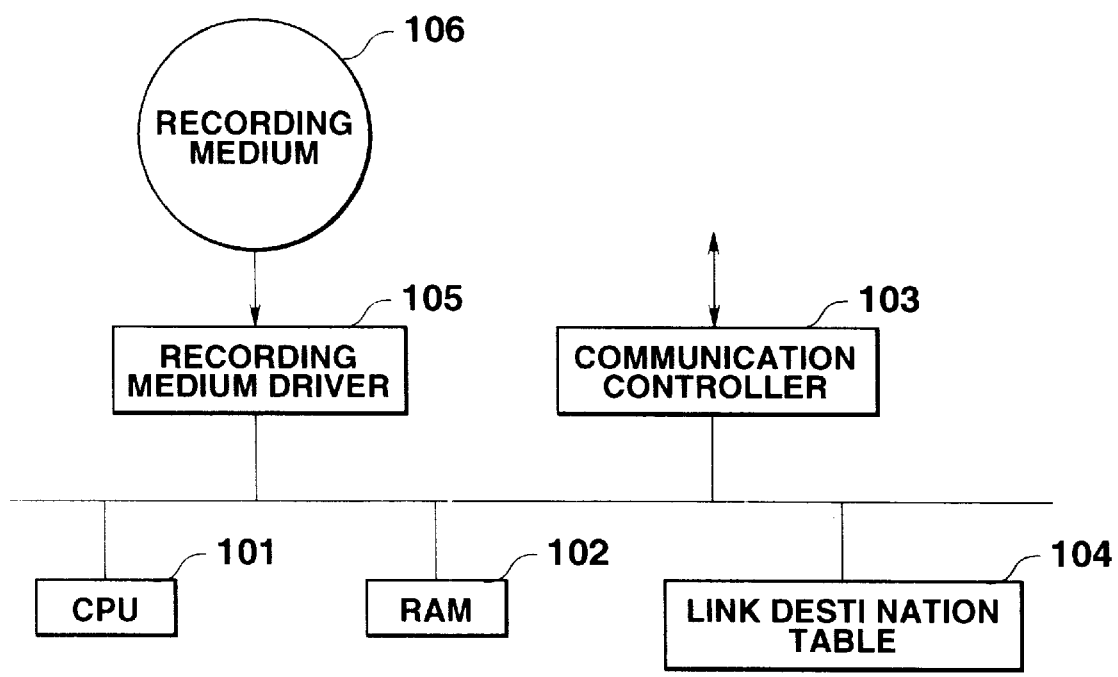
FIG. 1 is a block diagram showing the overall arrangement according to an embodiment of the present invention.

FIG. 1 shows the arrangement of a document data automatic linking apparatus according to an embodiment of the present invention.

This apparatus may be the same as a terminal operated by the user, or a server apparatus accessed by terminals as clients.

In the embodiment of the present invention, the apparatus comprises a CPU 101 for executing various processing programs (to be described later) associated with automatic linking, a RAM 102, a communication controller 103 for accessing a search site and link destination address sites, and a link destination table 104 as the characteristics feature of the present invention, which are connected via a bus. Note that the link destination table 104 is stored in, e.g., a hard disk device (not shown) or the like in practice.

Also, the apparatus comprises a storage medium driver 105 connected to the bus to read each processing program associated with automatic linking from a storage device 106 and loading it onto the RAM 102. The storage medium 106 comprises a portable recording medium such as a floppy disk, CD-ROM disk, optical disk, removable hard disk, and the like.

Alternatively, each processing program may be loaded from a network line onto the RAM 102 via the communication controller 103.

Figure 2:
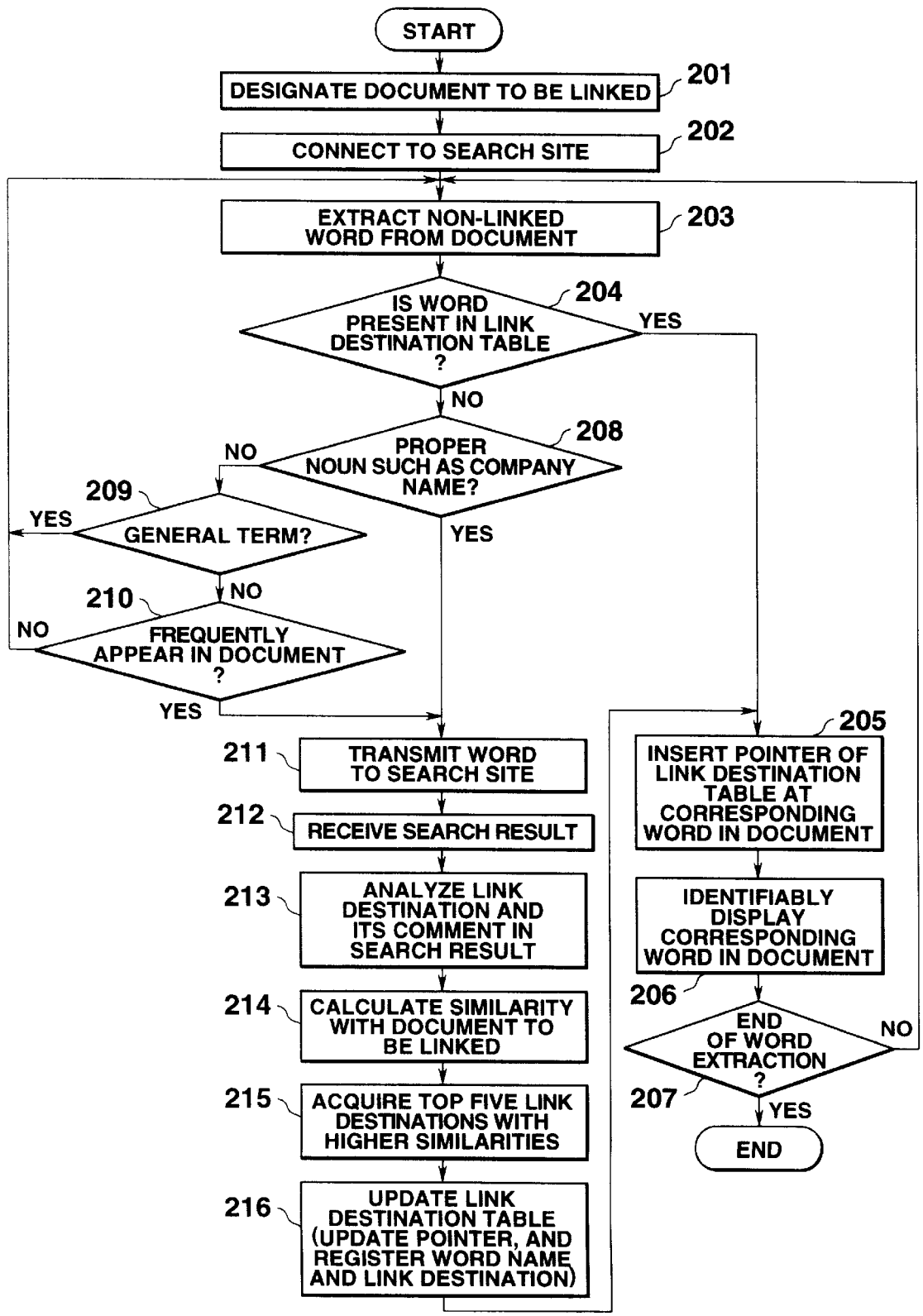
FIG. 2 is an operation flow chart of automatic linking.

FIG. 2 is an operation flow chart showing automatic linking executed by the system with the arrangement shown in FIG. 1.

The user designates a document for which a link destination address is to be set (step 201), and the apparatus is connected to a search site designated in advance (step 202).

Subsequently, a word having no link is extracted from the designated document (step 203).

The link destination table 104 is searched for the word extracted in step 203 (step 204).

The link destination table 104 has a data format shown in, e.g., FIG. 3, and registers one word name and one or more link destination addresses in units of entries designated by a pointer.

If it is determined in step 204 that the word extracted in step 203 is present in the link destination table, pointer information of an entry which contains that word in the link destination table 104 is inserted at the word position in the designated document (step 205).

The word in the designated document is identifiably displayed (e.g., displayed in a different character color or underlined) (step 206).

After that, it is checked if processing is complete for all the words in the designated document (step 207). If NO in step 207, the flow returns to step 203 to extract the next word having no link from the designated document.

If it is determined in step 204 that the word extracted in step 203 is not present in the link destination table, an appropriate search keyword is selected by a series of processes in steps 208 to 210.

That is, it is checked if the word extracted in step 203 is a proper noun such as a company name (step 208).

If YES in step 208, i.e., if the extracted word is a proper noun such as a company name, it is determined that the word is to be searched for, and the flow advances to step 211.

On the other hand, if NO in step 208, i.e., if the extracted word is not a proper noun such as a company name, it is checked if the extracted word represents a general idea (mountain, river, or the like). (step 209).

If YES in step 209, i.e., if the extracted word represents a general idea, it is determined that the word is not to be searched for, and the flow returns to step 203 to extract the next word having no link from the designated document.

If NO in step 209, i.e., if the extracted word does not represent any general idea, it is checked if the extracted word appears frequently in the designated document (step 210).

If YES in step 210, i.e., if the extracted word appears frequently in the designated document, it is determined that the word is to be searched for, and the flow advances to step 211.

On the other hand, if NO in step 210, i.e., if the extracted word does not appear so frequently in the designated document, it is determined that the word is not to be searched for, and the flow returns to step 203 to extract the next word having no link from the designated document.

If it is determined by the series of processes in steps 208 to 210 that the word extracted in step 203 is to be searched for, the word is transmitted to the search site designated in advance, and search processing of that word is executed at that site (step 211). Then, the search result is received by the automatic linking apparatus shown in FIG. 1 (step 212).

A link destination address included in the received search result and the corresponding comment are analyzed and extracted (step 213).

As a consequence, if the search result including one or more pairs of link destination addresses and comments is extracted, the similarity between the comment in one pair in the extracted search result, and the document contents designated in step 201 is calculated (step 214).

Figure 4:
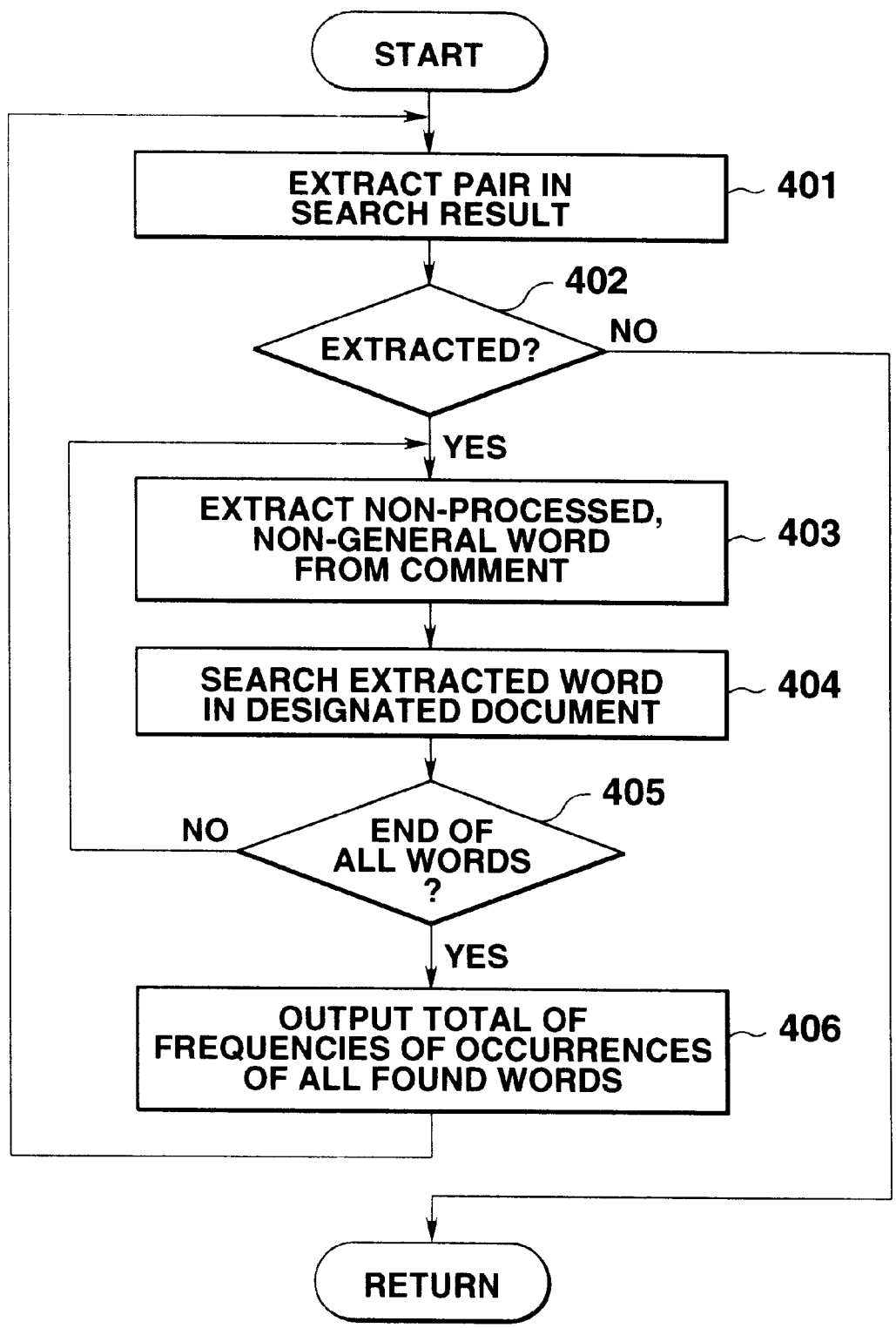
FIG. 4 is an operation flow chart of similarity calculation processing.

FIG. 4 is an operation flow chart showing an implementation example of similarity calculation in step 214.

The first pair is extracted from the search result analyzed in step 213 (step 401).

It is then checked if the first pair is extracted from the search result (step 402). If it is determined in step 402 that the first pair is extracted (YES), a series of processes in steps 403 to 406 are executed.

That is, a non-processed, non-general word is extracted from the comment in the extracted pair of the search result (step 403).

The document designated in step 201 is searched for the extracted word, and its frequency of occurrences is counted (step 404). Note that the search range may be the entire designated document or the paragraph where the word extracted in step 203 is included.

Upon completion of search, it is checked if the processing is complete for all the words in the comment in the extracted pair of the search result (step 405).

If NO in step 405, i.e., if the processing is not complete yet, the flow returns to step 403 to extract the next non-processed, non-general word from the comment of the extracted pair of the search result.

If YES in step 405, i.e., if the processing is complete for all the words in the comment in the extracted pair of the search result, the total of the frequencies of occurrences of all the found words is calculated, and is output as a similarity between the comment in that pair and the designated document (step 406).

After that, the flow returns to step 401 to extract the next pair from the search result analyzed in step 213.

In this fashion, if NO in step 402, i.e., if the totals of the frequencies of occurrences of the words in the comment are obtained for all the pairs of the search results, and no pair remains in the search result, the similarity calculation in step 214 in FIG. 2 ends.

After the similarities between the comments in the respective pairs of the search result and the designated document are calculated, link destination addresses of the pairs with, e.g., top five similarities, are acquired (step 215).

Subsequently, in the link destination table 104 shown in FIG. 3, a new entry is created by updating a pointer, and the word name extracted in step 203 and the top five link destination addresses acquired in step 215 are registered in that entry (step 216).

Pointer information of the entry containing that word in the link destination table 104 is inserted at the word position in the designated document (step 205).

Next, the word in the designated document is identifiably displayed (step 206).

It is then checked if the processing is complete for all the words in the designated document (step 207). If NO in step 207, the flow returns to step 203 to extract the next word having no link from the designated document.

In this way, since the link destination table 104 is prepared, and only the pointer to an entry in the link destination table 104 is stored at the word position in the designated document, a group of link destination addresses need not be repetitively stored in units of positions of words which appear repetitively, thus efficiently setting the link destination addresses.

Figure 5:
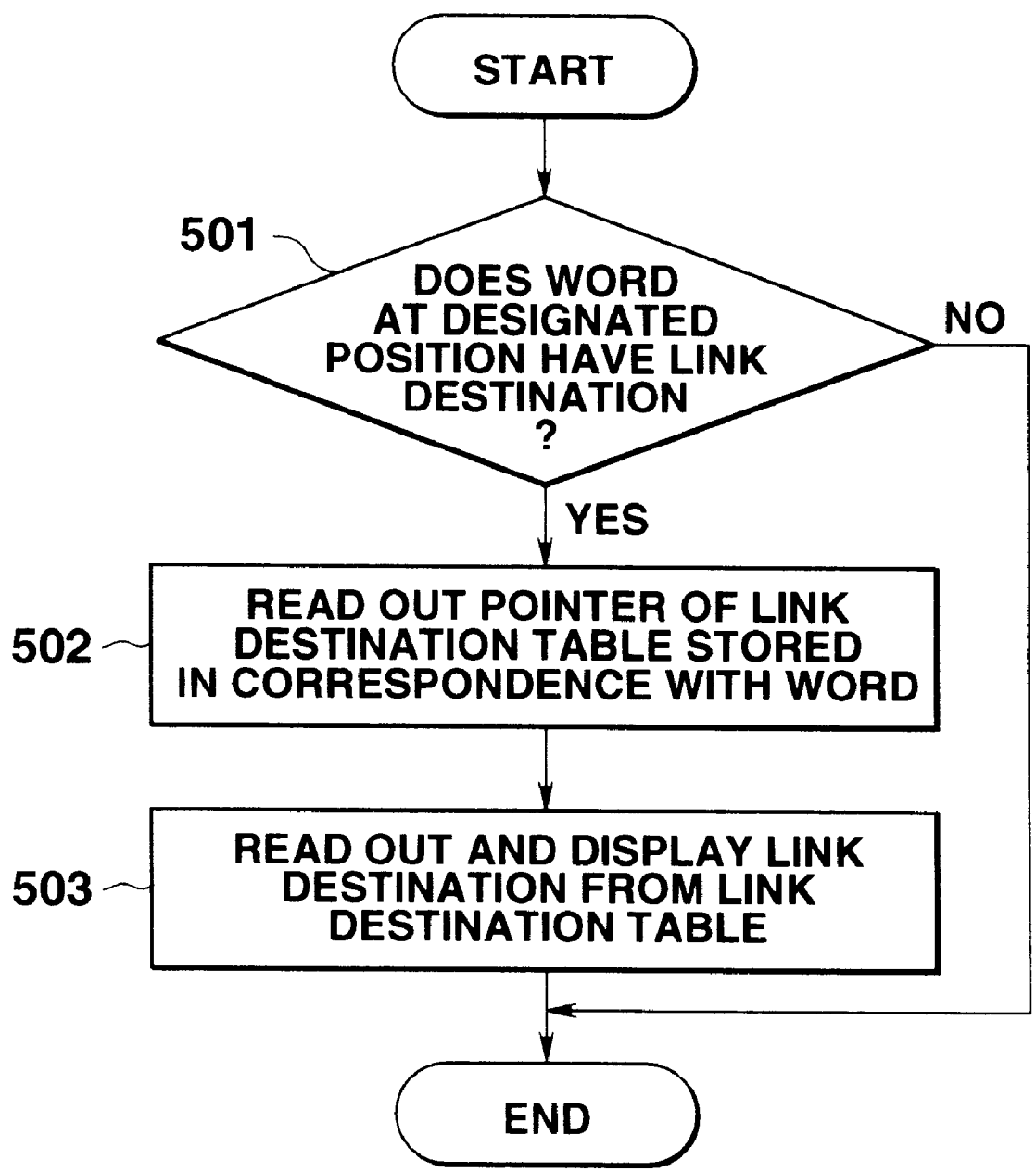
FIG. 5 is an operation flow chart of link destination display processing.

FIG. 5 is an operation flow chart showing the processing for displaying a list of link destination addresses for each word automatically linked to the designated document.

This processing is executed on the terminal operated by the user.

A program corresponding to this operation flow chart is started in response to a focus event generated every time the user adjusts a focus to each word on the designated document by cursor operation, mouse operation, pen touch operation, or the like.

Referring to FIG. 5, it is checked if a pointer for a link destination address is stored in correspondence with a word at the designated position (step 501).

If NO in step 501, i.e., if a pointer for a link destination address is not stored in correspondence with the word at the designated position, the processing shown in the operation flow chart in FIG. 5 ends.

If YES in step 501, i.e., if the pointer for a link destination address is stored in correspondence with the word at the designated position, the pointer is read out (step 502), and a list of link destination addresses is read out from an entry corresponding to the readout pointer in the link destination table 104 and is popup-displayed to be superposed on, e.g., the word position in the designated document window. The user can designate an arbitrary link destination address from the popup-displayed list of link destination addresses by cursor operation, mouse operation, pen touch operation, or the like.

Note that after the list of link destination addresses is read out, the first link destination address may be automatically accessed, and the next link destination address in the list may be accessed by, e.g., a command for designating the next link destination.

Figure 6:
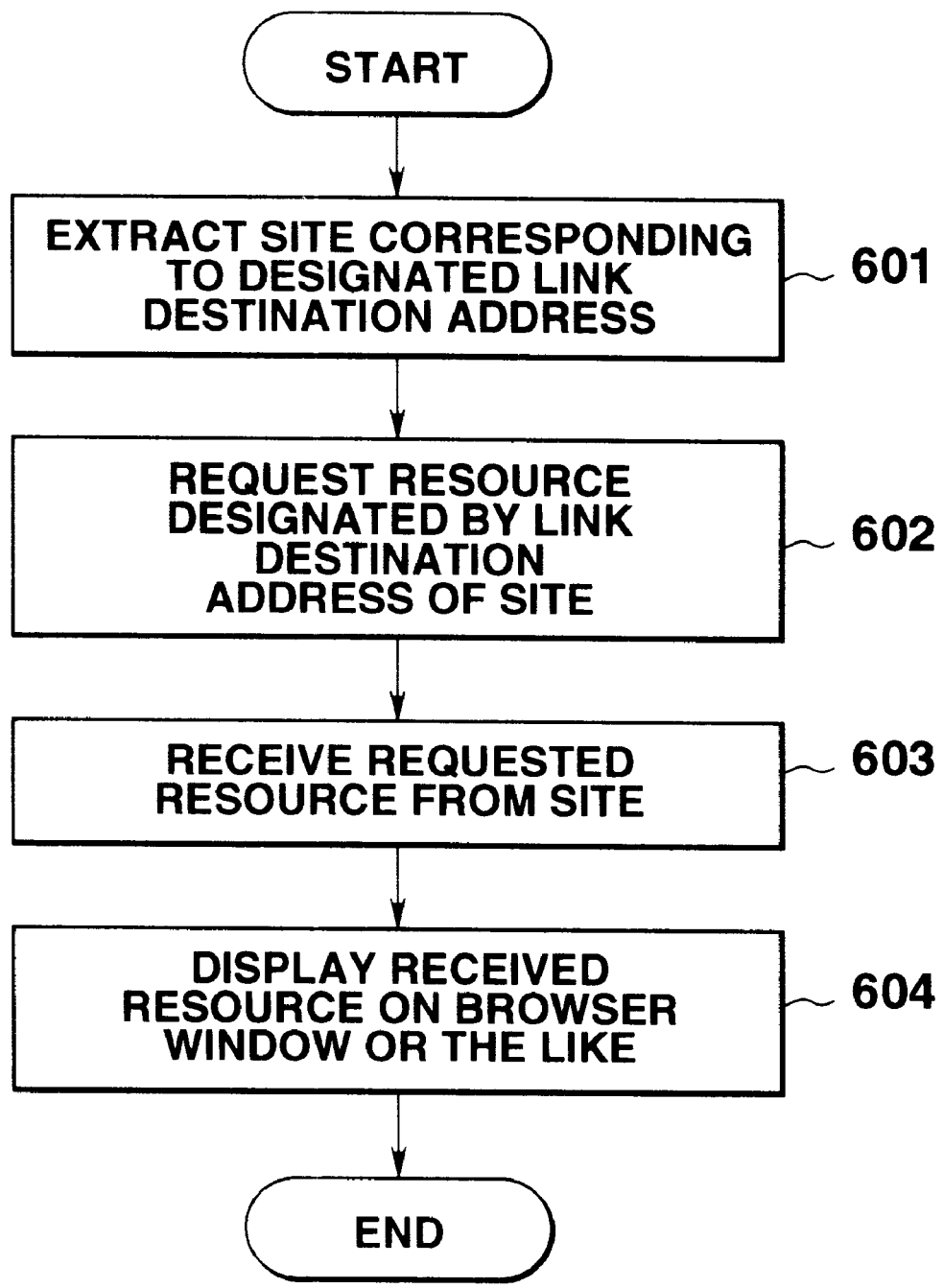
FIG. 6 is an operation flow chart of access processing to a link destination address.

FIG. 6 is an operation flow chart showing the operation upon accessing one link destination address.

A site corresponding to the designated link destination address is extracted (step 601). This processing is implemented as the one for acquiring an IP (Internet protocol) address corresponding to the link destination address by inquiring of a specific DNS (domain name system) on the network.

Then, the site is requested of a resource designated by the link destination address (step 602). This processing is implemented as the one for transmitting an HTTP (hypertext transfer protocol) message containing a Web page designated by the link destination address after encapsulating that message in a TCP (transfer control protocol)/IP packet with the designated IP address.

Subsequently, the requested resource is received from the site (step 603). This processing is implemented as the one for receiving from the site the TCP/IP packet containing the HTTP message storing the resource.

The received resource is displayed on, e.g., a browser window (step 604). When the received resource contains multimedia data such as image data, audio data, and the like, a helper application program corresponding to the received data is started.

Figure 7:
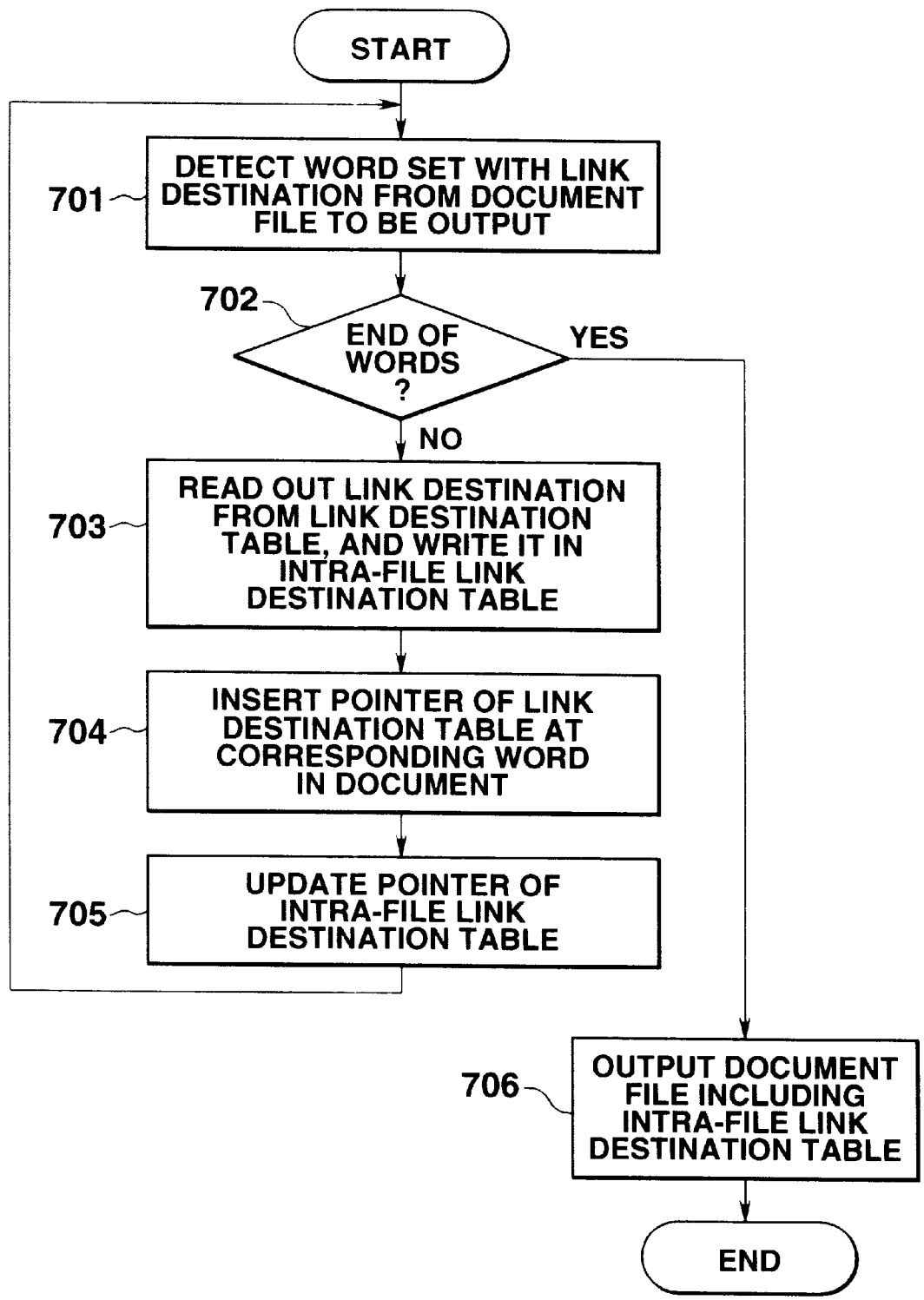
FIG. 7 is an operation flow chart of creation processing of a document file including an intra-file link destination table.

FIG. 7 is an operation flow chart showing the processing for creating a document file containing a document automatically linked by the operation shown in the operation flow chart in FIG. 2 so as to transmit/store the document to another terminal or in another storage medium.

This document file has a data format shown in, e.g., FIG. 8, and contains an intra-file link destination table as a new link destination table including entries in the link destination table 104 corresponding to the document.

Referring to FIG. 7, a word set with a pointer for a link destination address is detected from the document file to be output (step 701).

It is then checked if word detection is complete (step 702).

If NO in step 702, i.e., words to be detected still remain, the link destination list is read out from an entry in the link destination table 104 corresponding to the pointer stored in correspondence with that word, and is written in a new entry in the intra-file link destination table (FIG. 8) set in the document file (step 703).

Subsequently, the pointer in the link destination table 104 is inserted and stored at the corresponding word position in the document (step 704).

In response to this processing, the pointer value of the entry in the intra-file link destination table in which data has been written in step 703 is updated to the pointer value stored in step 704 (step 705).

After that, the flow returns to step 701 to detect the next word set with a pointer for a link destination address from the document file to be output.

If YES in step 702, i.e., if the processing is complete for all the words set with pointers for link destination addresses in the document file to be output, the document file containing the intra-file link destination table is output (step 706), thus ending the output document file creation processing.

When such output document file is created, an automatically linked document can be distributed.

In the operations of the aforementioned embodiment, when the user accesses an arbitrary link destination address by the processes shown in the operation flow charts in FIGS. 5 and 6, the number of access times to each link destination address may be stored in the link destination table 104, and the order of link destination addresses registered in each entry in the link destination table 104 may be rewritten to display a list of link destination addresses in the order from higher access frequencies on the basis of the storage contents.

Also, the registration contents of each link destination address in each entry in the link destination table 104 may be edited, e.g., added, deleted, modified, and so forth.

In the above embodiment, the user designates a document to be linked. Alternatively, a new, created document or updated document may be automatically detected upon opening or closing the document, and the detected document may be automatically linked.

Furthermore, when only a portion of the document is edited, only the edited portion may be automatically linked.

Note that the document may contain schedule data, memo data, table data, image data, and the like.

In the above embodiment, the word to be automatically linked is automatically extracted. Alternatively, the user may arbitrarily designate a word to be linked.

In the above embodiment, the data to be automatically linked are word data of proper nouns such as persons' names, place names, company names, and the like, and general terms which appear frequently, but may be image data, audio data, and the like. In case of image data, a link destination address having an image which has a higher similarity to that represented by the image data to be automatically linked is found by a search, and is set in correspondence with the image data. In case of audio data, a link destination address having a voice of a speaker which has a high similarity to that of a speaker of the audio data to be automatically linked is found by a search, and is set in correspondence with the audio data.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An apparatus for distributing a linked-document data file, comprising:
   a link destination table entry content extraction module for extracting corresponding entry contents in a link destination table on the basis of access information stored in correspondence with each of linked document elements in document data; and
   an intra-file link destination table registration module for registering the extracted entry contents in an intra-file link destination table as a new link destination table in the document data file in units of document elements, and updating the access information stored in correspondence with each document element to information corresponding to a corresponding entry in said intra-file link destination table.

2. A document data linking apparatus comprising:
   means for extracting, from document data, a document element to be inquired to a search site;
   link information storage means for storing the extracted document element and a link destination address in correspondence with the extracted document element;
   determining means for determining whether or not the link destination address corresponding to the extracted document element has already been stored in the link information storage means;
   transmission means for transmitting the extracted document element to the search site if the determining means determines that the link destination address corresponding to the extracted document element is not stored in the link information storage means;
   receiving means for receiving, from the search site, a searched link destination address relating to the extracted document element; and
   link information updating means for storing the received link destination address in the link information storage means in correspondence with the extracted document element.

3. The apparatus according to claim 2, wherein:
   the receiving means receives a search result including the searched link destination address and link destination information associated with the searched link destination address;
   similarity detecting means is provided for detecting a similarity between contents of the searched link destination information included in the search result and contents of the document data; and
   the receiving means selects and stores the searched link destination address based on a detection result of the similarity detection means so that the searched link destination address is associated with link destination information having a high similarity to the document data.

4. The apparatus according to claim 2, further comprising control means for controlling said apparatus to perform extraction of each document element in the document data and updating of the link destination address stored in correspondence with each document element in the document data at a timing at which the document data is edited.

5. The apparatus according to claim 4, wherein the control means further controls said apparatus to perform extraction of an edited document element in the document data and updating of the link destination address stored in correspondence with the edited document element in the document data.

6. The apparatus according to claim 4, wherein the control means further controls said apparatus to perform extraction of a user specified document element in the document data and updating of the link destination address stored in correspondence with the user specified document element in the document data.

7. The apparatus according to claim 2, further comprising editing means for editing registered contents of each link destination address in the link information storage means.

8. A document data link destination address displaying/accessing apparatus comprising:
   means for extracting, from document data, a document element to be inquired to a search site;
   link destination address inquiry means for inquiring of the search site about the extracted document element, and for receiving a search result including a link destination address relating to the extracted document element and link destination information associated with the link destination address;
   similarity detecting means for detecting a similarity between contents of the received link destination information and contents of the document data;
   link information updating means for storing the received link destination address in a link destination information storage device in correspondence with the extracted document element, based on a detection result of the similarity detecting means;
   designating means for designating the extracted document element in the document data;
   list display means for reading the link destination address corresponding to the designated document element from the link destination information storage device, and for displaying the read out link destination address in correspondence with the designated document element; and
   request access means for connecting to a site of the displayed link destination address, and for receiving information from the connected site.

9. The apparatus according to claim 8, wherein:

the document data is text data and the document element is word data;

the link destination information is descriptive data of the link destination address; and the similarity detection means detects the similarity by counting, with respect to each search result, frequencies that a word in the descriptive data appears in the document data.

10. The apparatus according to claim 8, wherein:

a plurality of link destination addresses are stored in the link destination information storage device in correspondence with each extracted document element;

an access frequency of each link destination address is stored in correspondence with each extracted document element in the link destination information storage device; and the link destination list display means displays a list of the stored link destination addresses corresponding to the designated document element in a priority order in accordance with the access frequencies stored in the link destination information storage device.

11. An apparatus for distributing a document data file, comprising:

means for extracting, from document data, a document element to be inquired to a search site;

link destination address inquiry means for inquiring of the search site about the extracted document element, and for receiving a search result including a link destination address relating to the extracted document element and link destination information associated with the link destination address;

similarity detecting means for detecting a similarity between contents of the received link destination information and contents of the document data;

link information updating means for storing the received link destination address in a link destination information storage device in correspondence with the extracted document element, based on a detection result of the similarity detecting means; and intra-file link destination table register means for reading out the extracted document element from the link information storage means and for registering the extracted document element in an intra-file link destination table as a new link destination table within a file.

12. A computer readable storage medium storing a program for causing a computer to execute functions of:

extracting, from document data, a document element to be inquired to a search site;

storing the extracted document element and a link destination address in correspondence with the extracted document element;

determining whether or not the link destination address corresponding to the extracted document element has already been stored;

transmitting the extracted document element to the search site if it is determined that the link destination address corresponding to the extracted document element has not already been stored;

receiving, from the search site, a searched link destination address relating to the extracted document element; and storing the received link destination address in correspondence with the extracted document element.

13. A computer readable storage medium storing a program for causing a computer to execute functions of:

extracting, from document data, a document element to be inquired to a search site;

inquiring of the search site about the document element and receiving a search result including a link destination address relating to the extracted document element and link destination information associated with the link destination address;

detecting a similarity between contents of the link destination information contents of the document data;

storing the received link destination address in correspondence with the extracted document element, based on a result of the similarity detection;

designating the extracted document element in the document data;

reading the link destination address corresponding to the designated document element and displaying the read out link destination address in correspondence with the designated document element; and connecting to a site of the displayed link destination address, and receiving information from the connected site.

* * * * *